United States Patent [19]

Ichiyoshi

[11] Patent Number: 4,759,013
[45] Date of Patent: Jul. 19, 1988

[54] FDM-TDM TRANSMULTIPLEXING SYSTEM
[75] Inventor: Osamu Ichiyoshi, Tokyo, Japan
[73] Assignee: NEC Corporation, Tokyo, Japan
[21] Appl. No.: 905,427
[22] Filed: Sep. 10, 1986
[30] Foreign Application Priority Data
  Sep. 10, 1985 [JP] Japan ................. 60-198596
[51] Int. Cl.[4] ............................................. H04J 1/05
[52] U.S. Cl. .................................................. 370/70
[58] Field of Search ........................... 370/50, 70, 23
[56] References Cited

U.S. PATENT DOCUMENTS

| 3,676,598 | 7/1972  | Kurth           | 370/70 |
| 3,875,340 | 4/1975  | Roy et al.      | 370/70 |
| 4,312,062 | 1/1982  | Bellanger et al.| 370/70 |
| 4,412,325 | 10/1983 | Molo            | 370/70 |

OTHER PUBLICATIONS

Bellanger et al., "TDM-FDM Transmultiplexer: Digital Polyphase and FFT", 9/74; *IEEE Trans. on Comm.*; pp. 1199-1205; vol. com-22, No. 9.

*Primary Examiner*—Douglas W. Olms
*Assistant Examiner*—Marianne Huseman
*Attorney, Agent, or Firm*—Sughrue, Mion, Zinn, Macpeak, and Seas

[57] ABSTRACT

An FDM-TDM transmultiplexing system for a modulation/demodulation device which is applicable to a regenerative repeating system of a satellite or a ground radio communication system is disclosed which uses chirp-z-transform. A chirp filter is implemented with a digital circuit. The circuit scale of the digital chirp filter increases in proportion to a square root of the total number of channels N, enhancing miniaturization of an FDM-TDM transmultiplexer.

3 Claims, 8 Drawing Sheets

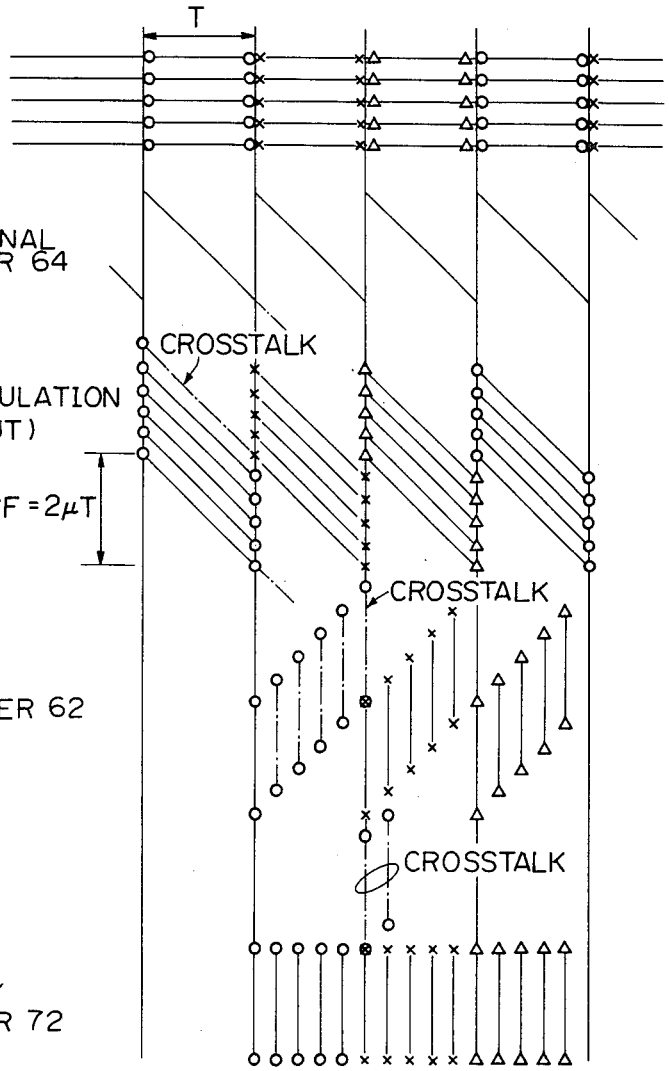

CHIRP MODULATION
(70 OUTPUT)

CHIRP FILTER 62
(NO DISTORTION)

CHIRP FILTER 62
OUTPUT
(DISTORTION)

FDM-TDM TRANSMULTIPLEXING SYSTEM

BACKGROUND OF THE INVENTION

The present invention relates to a frequency-division-multiplexing (FDM)-time-division-multiplexing (TDM) transmultiplexing system applicable to a regenerative repeating system which is associated with a satellite or a ground radio communication system.

In parallel with the advance of digital communication technologies, the demand for an FDM-TDM transmultiplexer which interconnects the conventional FDM analog modulated signal system and the TDM digital signals system is increasing. As regards satellite communications, there is an increasing demand for a modulation/demodulation device capable of performing FDM-TDM conversion on board a satellite in order to transmultiplex traditional single channel per carrier (SCPC) signals and modern TDMA signals. Further, because the data rate becomes diversified with the evolution of mobile communication and business communication, a group modulation/demodulation device to be loaded has to meet requirements not only in the aspect of performance but also in that of flexibility of functions.

Today, a Fast Fourier Transform (FFT)-filter method and a chirp-z-transform method are available as FDM-TDM transmultiplexing implementations. In the chirp-z-transform method, a chirp filter and a chirp signal generator have heretofore been implemented with Surface Acoustic Wave (SAW) elements. This is advantageous, however, since the delay time which is attainable with SAW elements is limited and, therefore, it is difficult for FDM-TDM translation to be achieved on slow signals, i.e. signals in a narrow frequency band. Concerning matching between the chirp signal generator and the chirp filter, should it be distorted, time separation between channels would be effected to bring about crosstalk between the channels. This would result in fluctuations in the characteristics of the SAW elements due to temperature as well as in long-term fluctations, deteriorating characteristics as a whole. Especially, a transmultiplexer needs an utmost stability since it is expected to process a great number of signals collectively. Concerning business communication, on the other hand, while a plurality of data rates have to be accommodated, the chance for the method using SAW elements to successfully realize a required degree of flexibility is scarce.

Meanwhile, the FFT-filter method is implemented with digital circuits only and, therefore, very stable in characteristics. Although the FFT-filter method has been extensively applied to a transmultiplexer for the above reason, for N channels it requires an N-point FFT circuit and N digital subfilters with the result that the circuit is scaled up in proportion to the number of channels N.

SUMMARY OF THE INVENTION

It is therefore an object of the present invention to provide an FDM-TDM transmultiplexing system which shows stable characteristics.

It is another object of the present invention to provide an FDM-TDM transmultiplexing system capable of accommodating various data rates.

It is another object of the present invention to provide an FDM-TDM transmultiplexing system which is feasible for miniaturization.

It is another object of the present invention to provide a generally improved FDM-TDM transmultiplexing system.

In accordance with the present invention, in a frequency-division-multiplexing (FDM)-time-division-multiplexing (TDM) transmultiplexing system having an FDM-TDM multiplexer and a TDM-FDM multiplexer, the FDM-TDM multiplexer comprises a complex frequency conversion circuit for converting a frequency of an input signal by converting the input signal into a complex signal of a baseband, first and second analog-to-digital (AD) converters for respectively digitizing two signal sequences which are outputted by the complex frequency conversion circuit and comprised of a real part and an imaginary part, a first chirp signal generator consisting of M digital subfilters which, for a minimum square number ($M^2$) greater than a required total number of channels, operate based on a digital chirp filter principle, a first complex multiplier for multiplying outputs of the first and second AD converters and an output of the first chirp signal generator, a first chirp filter consisting of M digital subfilters which, for the minimum square number ($M^2$) greater than the required total number of channels, operate based on the digital chirp filter principle so as to perform a convolutional integration matched to the first chirp signal generator in response to an output of the first complex multiplier, a second complex multiplier for multiplying an output of the first chirp filter and an output of the first chirp signal generator, and first and second digital-to-analog (DA) converters for respectively DA converting two signal sequences which are outputted by the second complex multiplier. The TDM-FDM multiplexer comprises third and fourth AD converters for respectively digitizing analog input signals which are in twotime-divided sequences, a second chirp signal generator having the same construction as the first chirp signal generator, a third complex multiplier for multiplying outputs of the third and fourth AD converters and an output of the chirp second signal generator, a second chirp filter constructed in the same manner as the first chirp filter to perform a convolutional integration matched to the second chirp signal generator in response to an output of the third complex multiplier, a fourth complex multiplier for multiplying an output of the second chirp filter and an output of the second chirp signal generator, third and fourth DA converters for respectively DA converting two signal sequences which are outputted by the fourth complex multiplier, and a complex frequency conversion circuit for converting frequencies of two signal sequences which are outputted by the third and fourth DA converters, respectively.

The above and other objects, features and advantages of the present invention will become more apparent from the following detailed description taken with the accompanying drawings.

BRIEF DESCRIPTION OF THE DRAWINGS

FIGS. 3A to 3E are timing charts representative of operation of the FDM-TDM multiplexer which is shown in FIG. 2A;

DESCRIPTION OF THE PREFERRED EMBODIMENT

Figure 1A:
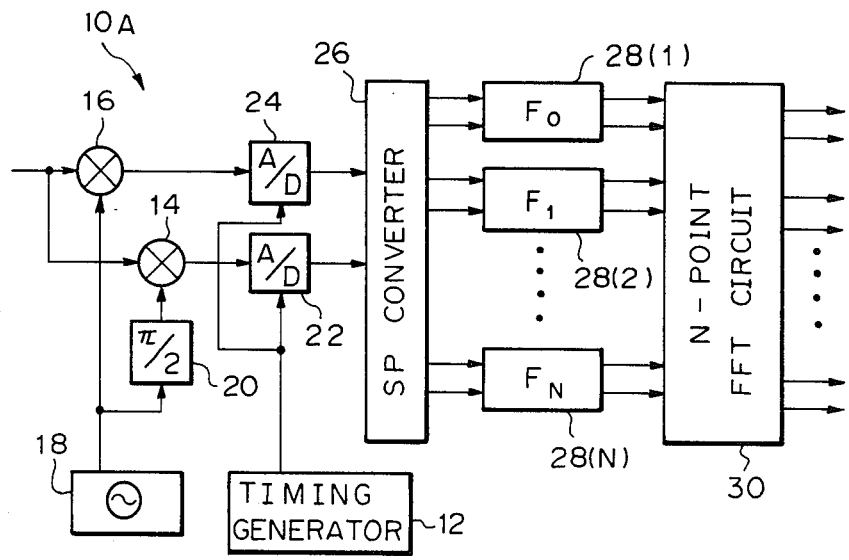
FIGS. 1A and 1B are block diagrams respectively showing an FDM-TDM multiplexer and a TDM-FDM multiplexer which use the prior art FFT-filter method.

To better understand the present invention, a brief reference will be made to a prior art FDM-TDM transmultiplexing system, shown in the drawings. First, the prior art FFT-filter method which is one of prior art FDM/TDM ransmultiplexing approaches will be described with reference to FIGS. 1A to 1B. Specifically, an FDM-TDM multiplexer is shown in FIG. 1A and a TDM-FDM multiplexer in FIG. 1B. The FDM-TDM multiplexer of FIG. 1A, generally 10A, consists of a timing generator 12, mixers 14 and 16, a local oscillator 18, a $\pi/2$ phase shifter 20, analog-to-digital (AD) converters 22 and 24, a serial-to-parallel (SP) converter 26, N digital filters 28(1) to 28(N), and an N-point FFT circuit 30. Here, N is representative of the total number of channels. Likewise, a TDM-FDM multiplexer of FIG. 1B, generally 10B, consists of an N-point inverse FFT circuit 32, digital filters 34(1) to 34(N) which are matched with the digital filters 28(1) to 28(N), a PS converter 36, digital-to-analog (DA) converters 38 and 40, a $\pi/2$ phase shifter 42, a local oscillator 44, mixers 46 and 48, and a signal combining circuit 50. As for the operation of a transmultiplexer having such a construction, a reference may be made to "TDM-FDM Transmultiplexing: Digital Polyphase and FFT", IEEE Transactions on Communications, Vol. Com-22, No. 9, September 1974.

Figure 2A:
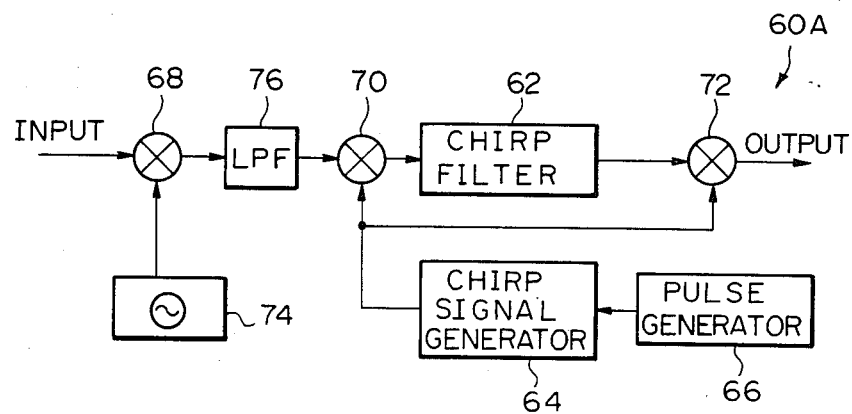
FIGS. 2A and 2B are block diagrams respectively showing an FDM-TDM multiplexer and a TDM-FDM multiplexer which use the prior art chirp-z-transform method.
Figure 2B:
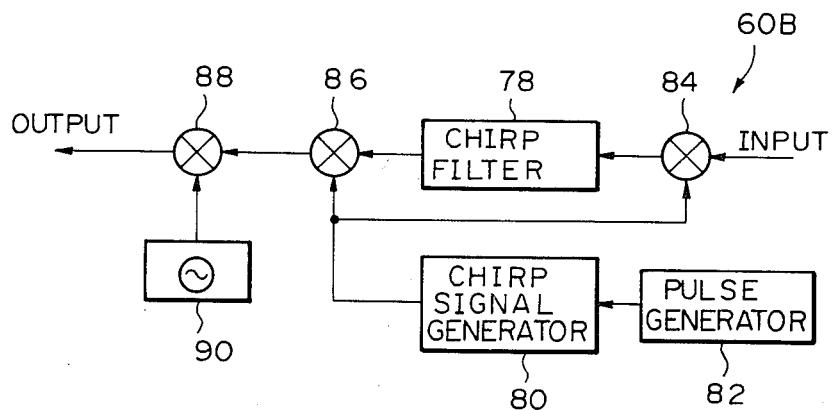

Referring to FIGS. 2A and 2B, the principle of chirp-z-transform is shown. FIG. 2A shows an FDM-TDM multiplexer and FIG. 2B a TDM-FDM multiplexer. In FIG. 2A, the FDM-TDM multiplexer 60A consists of a chirp filter 62, a chirp signal generator 64, a pulse generator 66, mixers 68, 70 and 72, a local oscillator 74, and a low-pass filter (LPF) 76. Likewise, the TDM-FDM multiplexer 60B of FIG. 2B consists of a chirp filter 78, a chirp signal generator 80, a pulse generator 82, mixers 84, 86 and 88, and a local oscillator 90. Details of operation of the transmultiplexer which uses chirp-z-transform are described in "Real Time Network Analyzer Employing Surface Acoustic Wave Chirp Filters", 1975 Ultrasonics Symposium Proceedings, IEEE Cat 75 CHO 994-4SU.

Referring to FIGS. 3A to 3E and 4A to 4C, there are demonstrated normal and abnormal operating conditions of the circuitries as shown in FIGS. 2A and 2B. In these drawings, frequency is shown along the ordinate and time is shown along the abscissa. Assume that the pulse generator 66 has generated a sequence of impulses having a period T. As the impulse sequence is applied to the chirp signal generator 64, a repetitive signal appears at the output of the chirp generator 64, as shown in FIG. 3B. An input FDM signal is multiplied by the chirp signal in the multiplier 70 and, thereby, chirp-modulated as shown in FIG. 3C. The chirp signal is an FM signal the frequency of which sequentially lowers with the lapse of time. The chirp filter 62, on the other hand, is matched with the chirp signal generator 64 and has a group delay characteristic which increases with frequency. Hence, as shown in FIG. 3D, the chirp filter 62 produces a signal sequence which is separated channel by channel with respect to time. In this instance, the waveform of each of the discrete signals is expressed as $$\frac{1}{2\pi} \int_{-\mu T}^{\mu T} e^{j\omega t}\, d\omega = 2\mu T \cdot \frac{\sin\mu T \cdot t}{\mu T \cdot t} = F \cdot \frac{\sin\pi Ft}{\pi F} \qquad \text{Eq. (1)}$$

where $\mu$ is a chirp rate and F a total frequency sweeping width. The width of 1/F substantially constitutes a pulse.

In order that signal pulses on N channels may be provided during a time period T, the pulse width has to be smaller than T/N and this requires conditions $$F \geq N \cdot R \qquad \text{... Eq. (2)}$$

$$\mu = \pi F R \geq \pi N R^2 \qquad \text{... Eq. (3)}$$

where R is a baud rate of signals which is represented by $$R = 1/T \ldots \qquad \text{Eq. (4)}$$

Figures 4A, 4B, 4C:
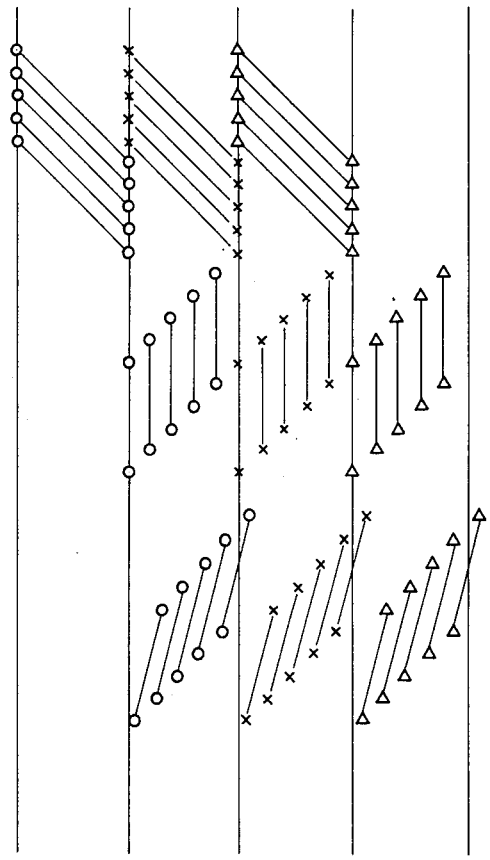
FIGS. 4A to 4C are timing charts demonstrating a situation wherein crosstalk is caused by distortions of matching of the FDM-TDM multiplexer as shown in FIG. 2A.

It has been customary to use SAW elements as the chirp filter 62 and chirp signal generator 64. With SAW elements, however, the delay time available is limited so that it is difficult to accomplish FDM-TDM multiplexing on slow signals, i.e., signals lying in a narrow frequency band, as previously discussed. As regards matching between the chirp signal generator 64 and the chirp filter 62, should it be distorted, time separation between channels would be effected to bring about crosstalk between the channels, as shown in FIG. 4C. This would result in fluctuations in the characteristics of the SAW elements due to temperature as well as in long-term fluctuations, deteriorating characteristics as a whole. Especially, a transmultiplexer needs an utmost stability since it is expected to process a great number of signals collectively. Concerning business communication, on the other hand, while a plurality of data rates have to be accommodated, the chance for the method using SAW elements to successfully realize a required degree of flexibility is scarce.

Figure 1B:
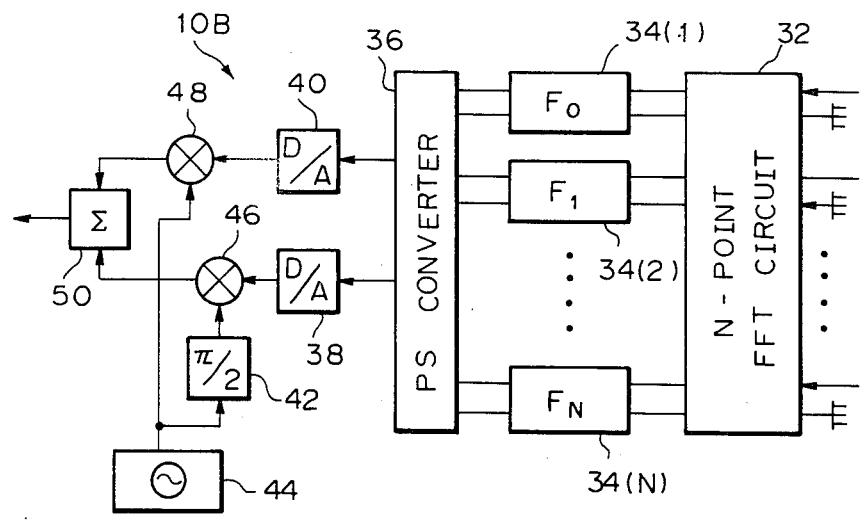

Meanwhile, the FFT-filter method as shown in FIGS. 1A and 1B is implemented with digital circuits only and, therefore, very stable in characteristics. Although the FFT-filter method has been extensively applied to a transmultiplexer for the above reason, for N channels it requires an N-point FFT circuit and N digital subfilters with the result that the circuit is scaled up in proportion to the number of channels N, as also previously described.

The present invention contemplates to eliminate the drawbacks particular to the prior art schemes as stated above. Specifically, the present invention is directed to implementing the chirp filter with a digital circuit construction.

Assume that an input FDM signal is made up of N frequency-multiplex signals which were subjected to FDM at frequency intervals of Δ. Assuming that N is a perfect square, it is represented by $$N = M^2 \quad \ldots \text{Eq. (5)}$$

where M is an integer.

If N is not a perfect square, then $$M = [\sqrt{N}] + 1 \quad [\text{Eq. (6)}]$$

where the parenthesized term is representative of an integer part. The resultant degree of increase of sampling frequency becomes smaller relative to N if the latter is large.

The sampling frequency necessary for signals in a band width which is expressed as $$F = N \cdot \Delta f = M^2 \Delta f \quad \ldots \text{Eq. (7)}$$

to be complex-sampled may be F (Hz). At this instant, the impulse response of a chirp filter is produced by $$H(Z) = \sum_{n=0}^{\infty} e^{j\mu(n/F)^2} Z^{-n} \quad \text{Eq. (8)}$$

Assuming that the chirp ratio is the minimum value as provided by the Eq. (3), i.e., $$\mu = \pi \cdot N (\Delta f)^2 \quad \ldots \text{Eq. (9)}$$

then $$H(Z) = \sum_{n=0}^{\infty} e^{j\pi(n/M)^2} \cdot Z^{-n} \quad \text{Eq. (10)}$$

Dividing it into M subfilters, the impulse response is represented by $$H(Z) = \sum_{m=0}^{M-1} Z^{-m} \cdot H_m(Z^M) \quad \text{Eq. (11)}$$

In this instance, there holds an equation $$H_m(Z^M) = \sum_{l=0}^{\infty} e^{j\pi \left(\frac{lM+m}{M}\right)^2} Z^{-Ml} \quad \text{Eq. (12)}$$

$$= e^{j\pi \left(\frac{lu}{M}\right)^2} \cdot \frac{1}{1 + e^{j2\pi m/M} \cdot Z^{-M}}$$

It will be seen from the above that $M = \sqrt{N}$ digital tank groups suffice for the chirp filter to be completed. In the above equations, m is equal to $0, 1, 2, \ldots, M-1$.

Further, as shown in FIGS. 3A to 3E and 4A to 4C, it is essential that the impulse response of a chirp signal generator be provided not only with an opposite characteristic to the Eq. (10) which is representative of a chirp filter but also with a response of finite length. Specifically, the impulse response of a chirp signal generator is produced by $$H^*(Z) = \sum_{n=0}^{N-1} e^{-j\pi(n/M)^2} \cdot Z^{-n} \quad \text{Eq. (13)}$$

$$= \sum_{m=0}^{M-1} Z^{-m} H^*_m(Z^M) \quad \text{Eq. (14)}$$

where $$H^*_m(Z^M) = \sum_{l=0}^{M-1} e^{-j\pi(lM+m)^2/M^2} \cdot Z^{-Ml} \quad \text{Eq. (15)}$$

$$= e^{-j\pi \left(\frac{m}{M}\right)^2} \cdot \frac{1 - (-1)^M Z^{-M^2}}{1 + e^{-j2\pi m/M} \cdot Z^{-M}}$$

$$= \begin{cases} \overline{H_m(Z^M)} \cdot (1 - Z^{-N}) & (M \text{ is an even number}) \\ \overline{H_m(Z^M)} \cdot (1 + Z^{-N}) & (M \text{ is an odd number}) \end{cases} \quad \text{Eq. (16)}$$

In the Eq. (16), the overline signifies a complex pair.

By constructing a digital circuit as stated above, it is possible to produce a chirp signal generator with an impulse response which accurately has a finite length. It is important to note that the circuit scale of the digital chirp filter increases in proportion to the square root of N, the total number of channels. Hence, even if N is increased, the circuit scale does not increase so much.

Figure 5A:
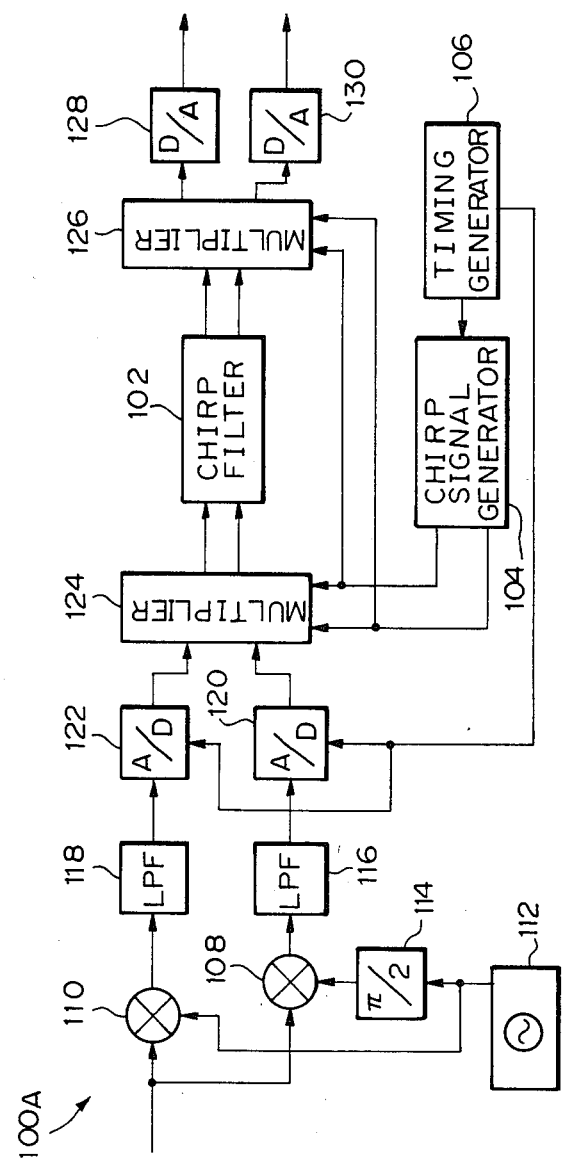
FIGS. 5A and 5B are block diagrams respectively showing an FDM-TDM multiplxer and a TDM-FDM multiplexer embodying the present invention.
Figure 5B:
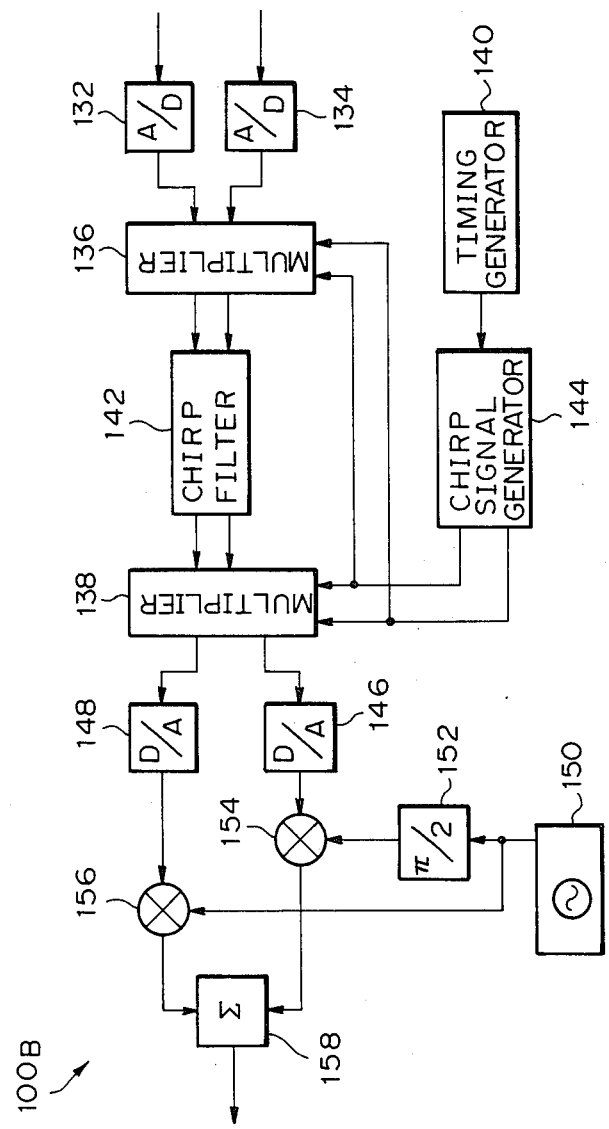

Referring to FIGS. 5A and 5B, an FDM-TDM multiplexer and a TDM-FDM multiplexer in accordance with the transmultiplexing system of the present invention are shown. As shown in FIG. 5A, the FDM-TDM multiplexer 100A comprises a digital chirp filter 102, a digital chirp signal generator 104, a timing generator 106, mixers 108 and 110, a local oscillator 112, a π/2 phase shifter 114, LPFs 116 and 118, AD converters 120 and 122, complex multipliers 124 and 126, and digital-to-analog (DA) converters 128 and 130. As shown in FIG. 5B, the TDM-FDM multiplexer 100B comprises AD converters 132 and 134, multipliers 136 and 138, a timing generator 140, a chirp filter 142, a chirp signal generator 144, DA converter 146 and 148, a local oscillator 150, a π/2 phase shifter 152, mixers 154 and 156, and an intermediate frequency (IF) signal combining circuit 158. The various components of the TDM-FDM multiplexer 100B each functions in the opposite direction to the associated component of the FDM-TDM multiplexer 100A. The operations of the multiplexers 100A and 100B are basically the same as those shown in the flowcharts of FIGS. 3A to 3E.

Figure 6:
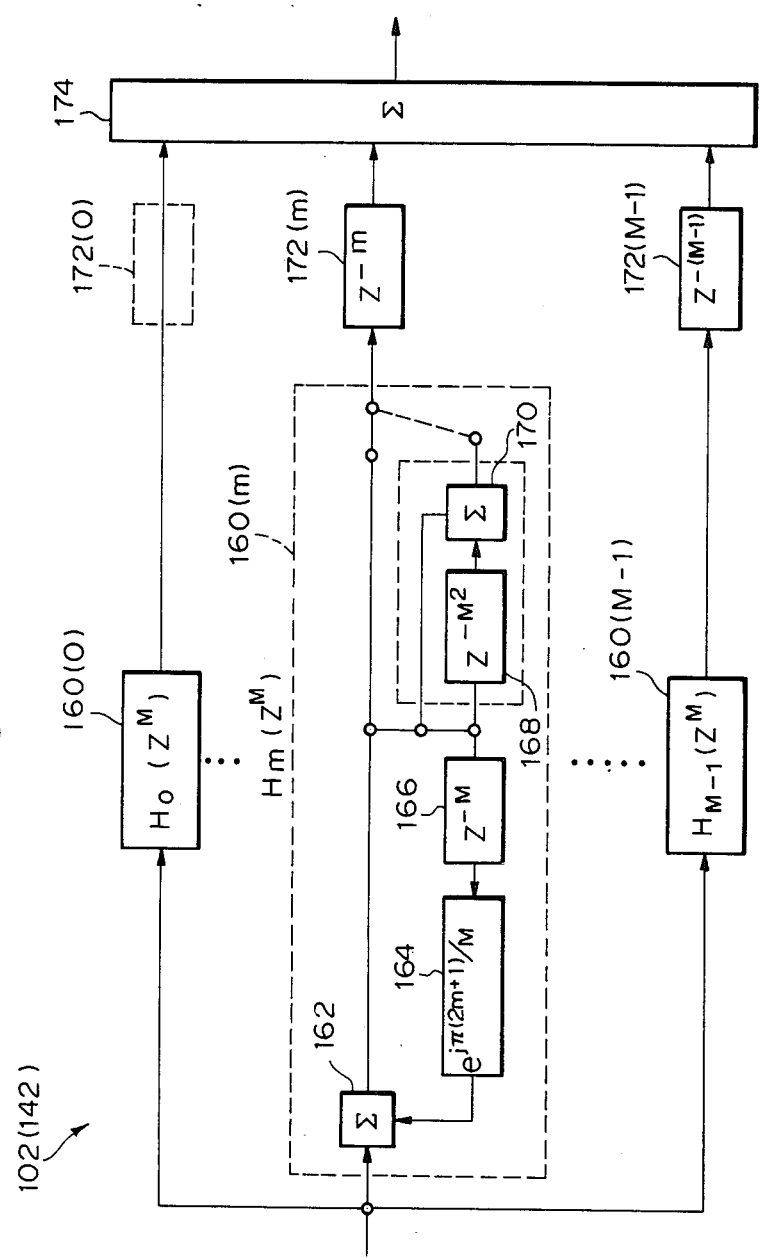
FIG. 6 is a block diagram showing a specific construction of a chirp filter or that of a chirp signal generator which is included in the embodiment of FIGS. 5A and 5B.

Referring to FIG. 6, a specific construction of the chirp filter 102 or 142 in accordance with the embodiment of FIGS. 5A and 5B is shown. As shown, the chirp filter 102 or 142 includes M subfilters 160 (0), ..., 160 (m), ..., 160 (M-1) each of which is constructed according to the Eq. (12) or (16). Each subfilter consists of an adder 162, a complex constant multiplier 164, an M-stage buffer memory 166, an $M^2$-stage buffer memory 168, and an adder 170. The chirp filter 102 or 142 further includes a sample delay elements 172(0), ..., 172(m), ..., 172(M-1) which are made up of 0, ..., m, ..., (M-1) sample delay elements. Designated by the reference numeral 174 is an M-input adder. It is to be noted that when connected as indicated by a dotted line in FIG. 6 the subfilters serve the function of chirp signal generators.

Figure 7A:
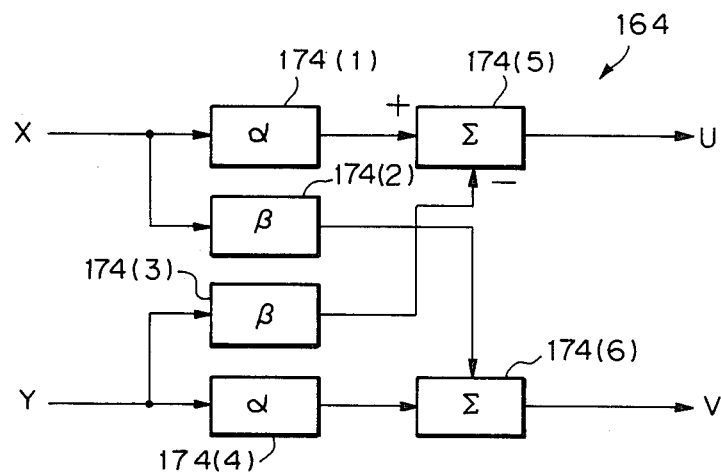
FIGS. 7A and 7B are block diagrams respectively showing specific constructions of a complex constant multiplier and an M-input adder of FIG. 6.
Figure 7B:
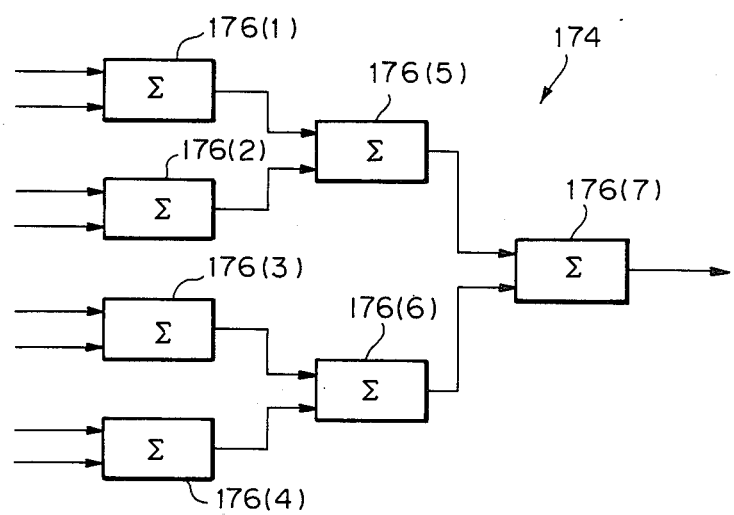

FIGS. 7A and 7B respectively show specific constructions of the complex constant multiplier 164 and M-input adder 174 which are included in the chirp filter of FIG. 6. Assume that by the constructions shown in FIGS. 7A and 7B there are performed complex constant operations:

$$\left.\begin{array}{l} W = (\alpha + j\beta) \cdot Z \\ Z = X + jY \\ W = U + jV \end{array}\right\} \quad \text{Eq (17)}$$

where $\alpha$ and $\beta$ are constants.

The multiplier 164 as shown in FIG. 7A consists of constant $\alpha$ multipliers 174(1) and 174(4), constant $\beta$ multipliers 174(2) and 174(3), and adders 174(5) and 174(6). The constant multipliers can be implemented with read only memories (ROMs) to enhance the simplicity of construction as well as the computation rate. As shown in FIG. 7B, the M-input adder 174 may generally be comprised of less than M adders 176(1) to 176(7). The construction shown in FIG. 7B is representative of a case wherein M is "8".

As described above, the chirp filter in accordance with the present invention generally has a pipeline structure and can operate at a high speed. Although only the subfilters (digital tank) 160(0), . . . , 160(m), . . ., 160 (M-1) are provided with feedback loops, high-speed operations are readily achieved due to the buffering function of the memory buffers 166. Further, systems with different data rates can be accommodated with ease merely by switching the ROMs and changing the sampling frequency.

In summary, it will be seen that the present invention provides an FDM-TDM transmultiplexing system which is feasible for miniaturization since the circuit scale increases in proportion to the square root of the number of channels N. Moreover, the system is implemented with digital multiplexing functions which enhance stability with respect to characteristics and promotes the ease of adaptation to various data rates. Thus, the system is desirably applicable to a regenerative repeating system for ground and satellite communications which are increasingly diversified for business and mobile applications.

Various modifications will become possible for those skilled in the art after receiving the teachings of the present disclosure without departing from the scope thereof.

What is claimed is:

1. A frequency-division-multiplexing (FDM)-time-division-multiplexing (TDM) transmultiplexing system having an FDM-TDM multiplexer and a TDM-FDM multiplexer, said FDM-TDM multiplexer comprising:
a first complex frequency conversion circuit for converting a frequency of an input IF signal by dividing the input IF signal into two streams which then are multiplied with two local signals with a $\pi/2$ phase difference to convert the input signal into a complex signal in baseband with a real and an imaginary component, said first complex frequency conversion circuit outputting first and second analog signal sequences respectively;
first and second analog-to-digital (AD) converters for respectively digitizing said first and second analog signal sequences to produce first and second digitized signal sequences;
a first digital chirp signal generator consisting of M digital subfilters which, for a minimum square number ($M^2$) greater than a required total number of channels, generate a complex local signal whose frequency varies linearly with time;
a first complex multiplier for performing complex multiplication on said first and second digitized signal sequences and outputs of said first digital chirp signal generator;
a first digital chirp filter consisting of M digital subfilters which, for the minimum square number ($M^2$) greater than the required total number of channels, perform a convolutional integration matched to said first digital chirp signal generator in response to outputs of said first complex multiplier;
a second complex multiplier for multiplying outputs of said first chirp filter and outputs of said first chirp signal generator to provide first and second digitized multiplier outputs; and
first and second digital-to-analog (DA) converters for respectively digital-to-analog converting said first and second digitized multiplier outputs;
said TDM-FDM multiplexer comprising:
third and fourth AD converters for respectively digitizing analog input signals which are time division multiplexed to produce third and fourth digitized signal sequences;
a second digital chirp signal generator having the same construction as said first digital chirp signal generator;
a third complex multiplier for multiplying said third and fourth digitized signal sequences and outputs of said second digital chirp signal generator;
a second digital chirp filter constructed in the same manner as said first digital chirp filter to perform a convolutional integration matched to said second digital chirp signal generator in response to outputs of said third complex multiplier;
a fourth complex multiplier for multiplying outputs of said second digital chirp filter and outputs of said second digital chirp signal generator to provide third and fourth digitized multiplier outputs;
third and fourth DA converters for respectively digital-to-analog converting said third and fourth digitized multipler outputs to produce third and fourth complex analog signal sequences; and
a second complex frequency conversion circuit, constructed in the same manner as said first complex frequency conversion circuit, for converting frequencies of said third and fourth complex analog signal sequences to produce output IF band signals.

2. A transmultiplexing system as claimed in claim 1, wherein each of said M subfilters in said first and second digital chirp filters comprises:
a first adder;
a complex constant multiplier whose output is provided as an input to said first adder;
an M-stage buffer memory whose input is connected to an output of said first adder, and whose output is provided as an input to said complex constant multiplier;
an $M^2$-stage buffer memory whose input is connected to an output of said first adder; and
a second adder whose input is connected to an output of said $M^2$-stage buffer memory, and whose output is connected to said inputs of said M-stage buffer memory and $M^2$-stage buffer memory;
said first and second digital chirp filters further comprising:
a plurality of M sample delay elements; and an M input adder for adding the outputs of said sample delay elements.

3. A transmultiplexing system as claimed in claim 2, wherein an output of said second adder is connected with an output of said first adder provided as an input to a respective one of said sample delay elements, such that each of said M subfilters acts as a chirp signal generator.

* * * * *

UNITED STATES PATENT AND TRADEMARK OFFICE
CERTIFICATE OF CORRECTION

PATENT NO. : 4,759,013

DATED : July 19, 1988

INVENTOR(S) : Ichiyoshi

It is certified that error appears in the above-identified patent and that said Letters Patent is hereby corrected as shown below:

COLUMN 1, LINE 14   Delete "signals" and insert --signal--;

COLUMN 1, LINE 32   Delete "advantageous" and insert --disadvantageous--;

COLUMN 2, LINE 37   Delete "twotime" and insert --two time--;

COLUMN 5, LINE 5    Delete "$\Delta$." and insert --$\Delta f$.--.

Signed and Sealed this

Seventh Day of February, 1989

Attest:

DONALD J. QUIGG

Attesting Officer

Commissioner of Patents and Trademarks